United States Patent
Lowin et al.

(10) Patent No.: US 11,481,263 B2
(45) Date of Patent: Oct. 25, 2022

(54) SYSTEM AND METHOD FOR THE REMOTE EXECUTION OF ONE OR MORE ARBITRARILY DEFINED WORKFLOWS

(71) Applicant: Prefect Technologies, Inc., Washington, DC (US)

(72) Inventors: Jeremiah Leeam Lowin, Washington, DC (US); Christopher D. White, Half Moon Bay, CA (US); Joshua Meek, Arlington, VA (US)

(73) Assignee: PREFECT TECHNOLOGIES, INC., Washington, DC (US)

( * ) Notice: Subject to any disclaimer, the term of this patent is extended or adjusted under 35 U.S.C. 154(b) by 0 days.

(21) Appl. No.: 16/945,161

(22) Filed: Jul. 31, 2020

(65) Prior Publication Data
US 2021/0034443 A1 Feb. 4, 2021

Related U.S. Application Data

(60) Provisional application No. 62/881,568, filed on Aug. 1, 2019.

(51) Int. Cl.
*G06F 9/54* (2006.01)
*G06F 16/23* (2019.01)

(52) U.S. Cl.
CPC .......... *G06F 9/547* (2013.01); *G06F 9/541* (2013.01); *G06F 16/2379* (2019.01)

(58) Field of Classification Search
None
See application file for complete search history.

(56) References Cited

U.S. PATENT DOCUMENTS

| 7,403,648 | B2 | 7/2008 | Nakamura | |
| 7,403,948 | B2 * | 7/2008 | Ghoneimy | G06Q 99/00 707/792 |

(Continued)

OTHER PUBLICATIONS

International Search Report and Written Opinion in corresponding PCT Application No. PCT/US2020/044568, dated Oct. 8, 2020. 11 pages.

(Continued)

*Primary Examiner* — Umut Onat
(74) *Attorney, Agent, or Firm* — Lando & Anastasi, LLP

(57) ABSTRACT

A system for the remote execution of one or more arbitrarily defined workflows comprises a workflow engine operative to perform one or more functions defined in a given workflow on customer computing infrastructure and a workflow administrator with access to a workflow database that maintains metadata defining the state of the given workflow, the workflow administrator remote from the workflow engine and not running on the customer computing infrastructure. A workflow administrator agent polls the workflow administrator to identify when the given workflow is scheduled for execution and, when scheduled, issues a command to the workflow engine to retrieve the given workflow from a workflow registry and perform the one or more functions defined in the given workflow on the customer computing infrastructure. The workflow administrator agent transmits state information regarding execution of the given workflow to the workflow administrator for storage in the workflow database.

20 Claims, 11 Drawing Sheets

(56) References Cited

U.S. PATENT DOCUMENTS

| | | | |
|---|---|---|---|
| 9,336,020 | B1 | 5/2016 | Oweis et al. |
| 9,665,437 | B2* | 5/2017 | Bhargava ............ G06F 16/1827 |
| 9,716,634 | B2 | 7/2017 | Sapuram et al. |
| 9,904,603 | B2* | 2/2018 | Mutalik .............. G06F 11/1446 |
| 9,934,480 | B2* | 4/2018 | Buth .................... G06Q 10/103 |
| 10,255,409 | B2* | 4/2019 | Kisiel ...................... G16B 5/00 |
| 2011/0153051 | A1 | 6/2011 | Bachman et al. |
| 2015/0143064 | A1* | 5/2015 | Bhargava ............ G06F 11/1451 |
| | | | 711/162 |
| 2017/0169368 | A1* | 6/2017 | Buth ....................... G06F 9/546 |

OTHER PUBLICATIONS

Amazon Web Services, Inc. AWS Glue: Developer Guide. 2020. 816 pages.

Amazon Web Services, Inc. Amazon Simple Workflow Service: Developer Guide. 2020. 154 pages.

Apache Airflow: Release Documentation. Release 1.10.2. Jun. 23, 2019. 444 pages.

Azkaban 3.0 Docs. Mar. 10, 2019. 157 pages.

BuildKite Agent v3 Docs. Jul. 25, 2019. 71 pages.

Ask Solem & contributors. Celery Manual. 2009-2016. 92 pages.

Anaconda, Inc. Dask.distributed Manual. 2016. 232 pages.

Fielder, Michael. "Don't Fear the Agent: Agent-Based Monitoring" Datadog. Oct. 9, 2013. 7 pages. Accessed Online Nov. 24, 2020. https://www.datadoghq.com/blog/dont-fear-the-agent/.

Luigi 2.8.7 Docs. Jul. 19, 2019. 72 pages.

Apache Software Foundation. Oozie 4.3.1 Manual. Feb. 14, 2019. 181 pages.

International Preliminary Report on Patentability dated Feb. 1, 2022, in connection with International Application No. PCT/US2020/044568.

* cited by examiner

SYSTEM AND METHOD FOR THE REMOTE EXECUTION OF ONE OR MORE ARBITRARILY DEFINED WORKFLOWS

CROSS REFERENCE TO RELATED APPLICATIONS

The present application claims priority to Provisional Patent Application No. 62/881,568, filed Aug. 1, 2019, entitled "SYSTEM AND METHOD FOR THE REMOTE EXECUTION OF ONE OR MORE ARBITRARILY DEFINED WORKFLOWS", the disclosure of which is hereby incorporated by reference herein in its entirety for all purposes.

BACKGROUND OF THE INVENTION

Workflow management solutions entail executing or otherwise running such workflow solutions on behalf of customers whose data is being managed. Execution of such workflow management solutions typically involve taking control of the execution of customer code within the internal network of the customer, which may further comprise interface with resources, both trusted and untrusted, outside the customer network. Execution of customer code both within and without a customer network provides a distinct trust problem: customers must trust the code that the provider of any workflow management software is going to execute within the customer network, whereas software providers must trust that any customer code and/or data that they receive is not malicious in nature, regardless of whether the injection such malicious code is intentional.

Accordingly, what is needed in the art are systems and methods that provide for the hybrid execution of one or more workflows and, more specifically, one in which actual code execution and data maintenance takes place within the customer environment, but orchestrated by one or more remote processes.

SUMMARY OF THE INVENTION

Embodiments of the present invention are directed towards systems and methods that provide for the fully managed remote orchestration of one or more workflow. In accordance with such embodiments, systems and methods are provided that split the task of orchestrating the execution of one or more workflows from the task of arbitrarily executing code within a customer environment. In accordance with this hybrid execution model, customer code always remains with the private infrastructure of the customer. As such, the customer designs, tests, and builds one or more workflows, a given workflow comprising one or more tasks. A customer may author a given workflow with a number of open and closed source tools, for example, the open source workflow authoring environment PREFECT CORE™ made available by Prefect Technologies, Inc. and downloadable from https://www.prefect.io./core. The software libraries and binaries that embody one embodiment of the PREFECT CORE workflow engine are publicly available at www.github.com/PrefectHQ/prefect, the disclosure of which is hereby incorporated by reference in its entirety.

When a workflow is ready, a customer registers the existence of a workflow with remote or cloud workflow infrastructure, which results in the transmission of metadata to the remote or cloud workflow infrastructure that is sufficient to reconstruct a code-less version of the workflow: details including, but not limited to, the task contained in a given workflow, the dependency structure of such tasks; the schedule for execution of the workflow; information about the runtime environment of the workflow; etc.

Once the remote or cloud workflow infrastructure in possession of such information, it can begin orchestrating the workflow even though such remote infrastructure does not have access to the underlying code executed as part of execution of the workflow. Workflow execution in accordance with one embodiment comprises placing the remote representation of a given workflow into a "scheduled" state. An agent, running on the customer infrastructure monitors for the availability of a workflow scheduled for execution. When the agent identifies a scheduled workflow, the agent retrieves the workflow and begins to execute the one or more tasks comprising the workflow. Such execution may take place locally or in a remote execution cluster, which is solely a deployment decision left to definition by the customer. As a given task comprising a workflow passes through a "running" state, it ultimately enters a state that includes "succeed", "fail", or "retry", with such information communicated back to the remote or cloud workflow infrastructure as one or more items of metadata. In this way, multiple concurrent workflows executing on the customer infrastructure can be coordinated through a central broker, all without requiring access to code or data resident on the customer infrastructure.

According to one embodiment, a system for remote execution of one or more arbitrarily defined workflows comprises a workflow engine operative to perform one or more functions defined in a given workflow on a customer infrastructure and a workflow administrator with access to a workflow database that maintains metadata that describes a state of the given workflow, the workflow administrator remote from the workflow engine and not running on the customer infrastructure. The system also comprises a workflow administrator agent that polls the workflow administrator to identify when the given workflow is in a state that is scheduled for execution. When the given workflow is scheduled, the workflow administrator agent issues a command to the workflow engine to retrieve the given workflow from a workflow registry and perform the one or more functions defined in the given workflow on the customer infrastructure, the workflow administrator agent transmitting state information regarding execution of the given workflow to the workflow administrator for storage in the workflow database.

The system according in accordance with the present embodiment also comprises an API to receive requests and commands from the workflow administrator agent for forwarding to the workflow administrator. Likewise, the API receives responses to requests and commands from the workflow administrator for forwarding to the workflow administrator agent. More specially, the workflow administrator may query a workflow database to retrieve information responsive to a request from a workflow administrator agent, which may comprise use of the API, and the request from the workflow administrator agent may comprise a query as to available workflows that require execution. Further building on the present embodiment, the workflow registry maintains business logic as to the steps that form a part of a given workflow, and the workflow engine may be located remote from the customer infrastructure.

A method for remote execution of one or more arbitrarily defined workflows in accordance with one embodiment comprises executing a workflow administrator agent on customer infrastructure and a workflow administrator on cloud infrastructure, the workflow administrator remote from the workflow engine, and providing the workflow administrator with access to a workflow database that maintains metadata describing a state of a given workflow. The workflow administrator agent polls the workflow administrator to identify when a given workflow is in a state that is scheduled for execution and, when the given workflow is scheduled for execution, issues a command to a workflow engine to retrieve the given workflow from a workflow registry and perform the one or more functions defined in the given workflow on the customer infrastructure. The workflow administrator agent transmits state information regarding execution of the given workflow to the workflow administrator for storage in the workflow database.

The method according to the present embodiment continues by an API receiving requests and commands from the workflow administrator agent, which forwards the received requests and commands to the workflow administrator. Similarly, the API receives responses to requests and commands from the workflow administrator that it forwards to the workflow administrator agent. The workflow administrator may query the workflow database to retrieve information responsive to a request from a workflow administrator agent, which may include communication with one or more workflow agents. According to one embodiment, querying the workflow database comprises querying as to available workflows that require execution. The method of the present embodiment may further comprise the steps of maintaining business logic as to the steps that form a part of a given workflow at the workflow registry and operating the workflow engine remote from the customer infrastructure.

BRIEF DESCRIPTION OF THE DRAWINGS

The invention is illustrated in the figures of the accompanying drawing which are meant to be exemplary and not limiting, in which like references are intended to refer to like or corresponding parts, and in which.

DETAILED DESCRIPTION OF EMBODIMENTS OF THE INVENTION

Figure 1:
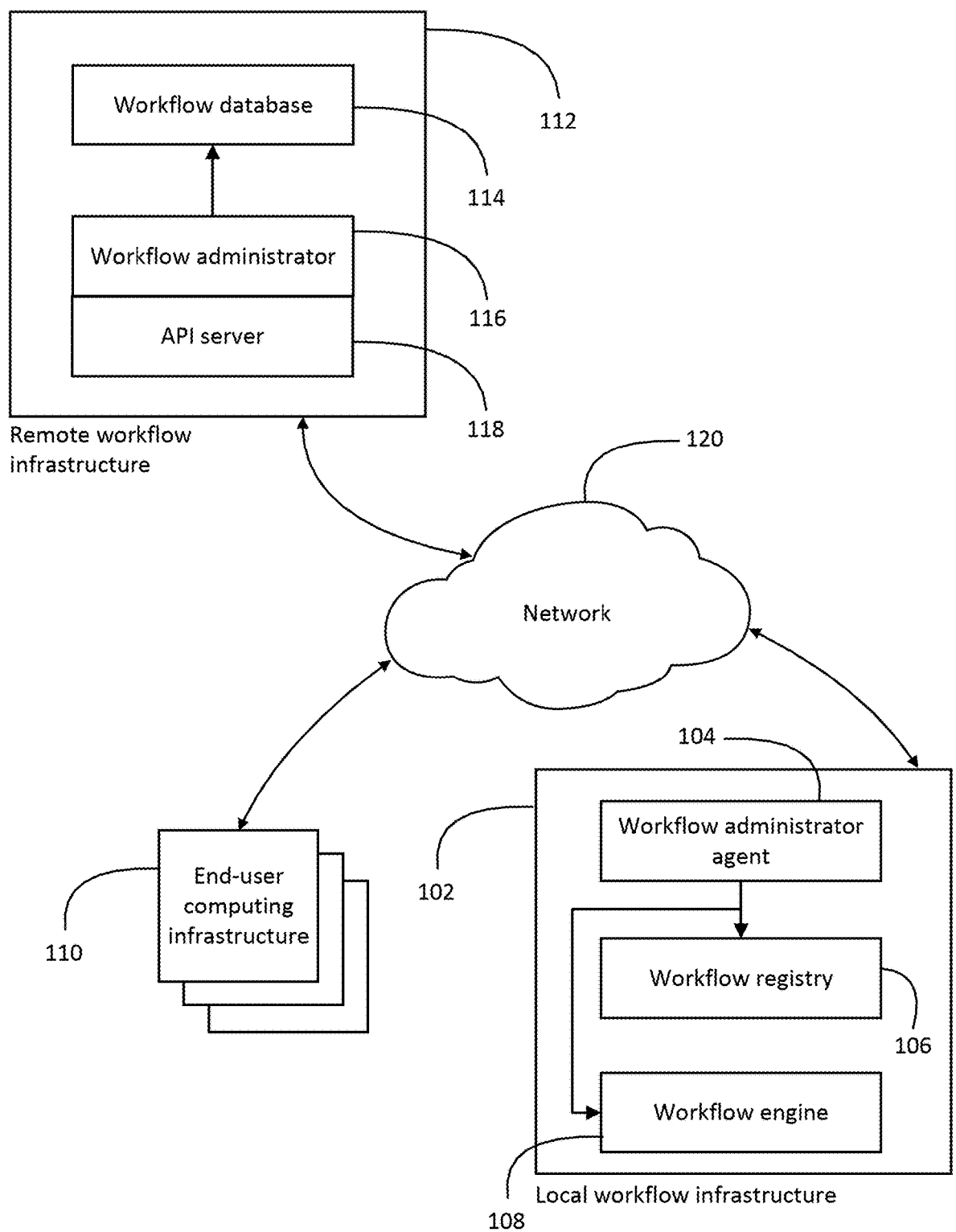
FIG. 1 presents a block diagram illustrating a system for the remote execution of one or more arbitrarily defined workflows according to one embodiment of the present invention.

A workflow, as such term is used herein, is a process comprising a number of discrete tasks that perform functions on or read data to/from end-user computing infrastructure. The tasks may be dependent on each other according to a system of rules governed by a "workflow engine" that is responsible for managing the state of each task in a given workflow. Exemplary rules include, but are not limited to, rules for preventing tasks from starting until one or more other tasks have entered specific states, allowing tasks to be scheduled or retried at specific times, allowing data produced by one task to be consumed by a later task, etc.

Two common offerings for the deployment of executable software systems, such as workflow execution systems that are the subject of the present application, are typically either fully managed or on-premise. Fully managed offerings involve storage and execution of all code on the infrastructure owned and/or operated by the service or software provider, whereas on-premise involves packaging software for deployment and execution on the end-user's infrastructure. The model for workflow deployment and execution as described in the present application is referred to as a "hybrid" execution model as it involves an amalgamation of both the managed and on-premise models.

In view of the foregoing, although it is useful to execute workflows in a given computing environment, there is a need for remote interaction with scheduled and executing workflows. The systems and methods of various embodiments of the present invention allow users to hook workflows that are developed in Core into a stateful architecture, including a workflow database and API server, which may be under the coordination and control of a workflow administrator component ("workflow administrator"). The system advantageously provides a full API that allows users to remotely interact with their workflows (for example, scheduling runs or setting states), as well as query the workflow database. In essence, programmatic constructs that are described herein "surround" a given workflow that is developed in Core and provide infrastructure required to manage and monitor the execution thereof.

One feature of embodiments of the present invention is that there is the elimination of any requirement to access actual code or data, either for a given workflow or that may be operated upon by a given workflow. As such, these systems only need access to metadata that describes a given workflow itself, which allows the creation of a process that allows end users to utilize Core to design workflows on local machines. Once designed, these workflows are "built", i.e., deployed to infrastructure owned and/or controlled by the end-user When deploying a workflow to end-user owned or controlled infrastructure, program code forming part of the workflow engine transmits metadata to the remote workflow database, e.g., located on one or more cloud servers. Metadata describing a given workflow and/or its state may include, but is not limited to, information such as the name of one or more tasks comprising a given workflow, dependencies between various tasks comprising a given workflow, which may comprise various combinations of temporal and data dependencies, etc. A workflow administrator may use this information to reconstruct "dummy" versions of a workflow, which it may then use to orchestrate the real workflows without ever knowing any substantive information regarding any given workflow. When an end-user wishes to execute a given workflow that has been defined and built, he or she sends a signal to the workflow administrator, which may include selecting a button on a user interface that the workflow administrator exposes to the end-user or issuing a command through an API or CLI call.

When attempting to initiate remote execution of a workflow, the workflow administrator uses metadata that the end-users previously saved into the workflow database to load up the requested workflow and put the dummy version in a "scheduled" state. An agent, which according to one embodiment is a small piece of code that the end-user runs on his or her private infrastructure, listens for entry of the workflow into the scheduled state and, upon finding such an event, instructs the workflow engine to deploy the workflow on the end-user's infrastructure. As the workflow runs, the agent communicates state change updates back to the workflow administrator for storage in the workflow database. Any modification of the dummy workflow residing at the remote workflow infrastructure can similarly be synchronized back to the end-user's infrastructure, for example manually placing tasks in a specific state before they actually run.

Accordingly, the workflow administrator can expose data in the workflow database to provide end-users with a complete overview of one or more workflows that such end user has built, e.g., what tasks are running, what tasks failed, how long each task took—as well as ways to interact with those workflow, without ever requiring those end-users to share their sensitive code or data.

System Infrastructure

FIG. 1 illustrates one embodiment of a system for hybrid deployment of workflow execution as described herein. The hybrid deployment model of the present invention involves a process in which end-users deploy a small agent 104 in his or her local workflow infrastructure 102. The agent 104 in accordance with one embodiment is a small application that the end-user installs on his or her local workflow infrastructure 102 to retrieve workflows from a workflow registry 106 for execution by a workflow engine 108, create workflow infrastructure, and optionally tear down said infrastructure, which may also be performed by the workflow engine 108. As the agent 104 runs it polls for new workflows (scoped to that specific end-user) that need to be executed. Once the agent 104 identifies such a workflow for execution, the workflow is passed to the workflow engine 108 that runs the workflow on end-user computing infrastructure 110.

In accordance with various embodiments of the present invention, the agent 104 may utilize additional techniques to identify workflows that require execution, also referred to herein as "polling", for example, long-lived connections, executing agents as web servers, and other message exchange techniques known to those of skill in the art. For example, another technique that would fall within the scope of "polling" as used herein is the deployment of one or more web sockets that enable interaction between the agent 104 and the remote workflow infrastructure with lower overhead than half-duplex alternatives, such as HTTP polling, which facilitates real-time data transfer to and from a given agent 104. Those of skill in the art recognize that other techniques that allow for data transfer to and from the agent as falling within the scope of "polling" as used herein.

In accordance with certain embodiments, an optional side process is running on the agent, referred to as a resource manager, that is responsible for examining workflow state to identify completed workflows and remove any of the dynamic infrastructure that was created during execution of a specific workflow. The resource manager is an extra step of security that prevents end-user computing infrastructure from becoming overrun with workflow infrastructure.

In addition to the workflow administrator agent 104, the local workflow infrastructure 102 in accordance with the present embodiment comprises a workflow registry 106 to hold workflow program code, e.g., binaries, dependencies, etc. The workflow registry 106 may be any form of data store that is suitable to maintain the workflows that the end-user is building for deployment on the end-user computing infrastructure 110, for example, a Docker registry, a NoSQL database, a relational database system, an object-oriented database system, a hybrid object-relational database, or other suitable data stores that are known to those of ordinary skill in the art. Indeed, the workflow registry may comprise any file system operative to or capable of storing files, binary large objects ("BLOBs"), or any arbitrary digital content. Specific examples of technologies that can be used to deploy the workflow registry include, but are not limited to, DockerHub, Google Container Registry, etc.

Finally, the workflow engine 108 requires a platform from which to run a given workflow that it is instructed to execute by the workflow administrator agent 104. Exemplary platforms from which the workflow engine 108 may run a given workflow include, but are not limited to, Kubernetes, Yarn, Mesos, etc.

In certain embodiments, a workflow contains additional items of information as metadata, including storage (where the workflow program code and required data is stored) and execution environment (a description of how to run the workflow). The workflow administrator agent 104 uses those pieces of metadata to retrieve the workflow program code from the workflow registry 106 and instruct the workflow engine 108 execute it on the end-user computing infrastructure.

The end-user provides an authorization token (not pictured) to allow the workflow administrator agent 104 to authenticate itself over the network 120 with the remote workflow infrastructure 112. Through the process of polling and the exchange of metadata, the workflow administrator 116 and the workflow administrator agent 104, via the API server 118 and network 120, are able to deploy and execute workflows by the workflow engine 108 on the end-user computing infrastructure 110 without ever "talking out" to such infrastructure. As such, network perimeter security or integrity remains intact while still allowing for remote execution of one or more local workflows.

This architectural arrangement allows end-users to manage their own computing infrastructure, which further allows them to maintain the security of their processes and, perhaps more importantly, maintain their use of any security protocols and processes that are already in place and invested in by the customer. Additionally, user-written "result handlers" can be used to store the outputs of tasks in private locations, with only the necessary metadata for retrieving such data communicated back to workflow administrator (e.g., the URI of the location).

Workflow Building and Deployment

Figure 2:
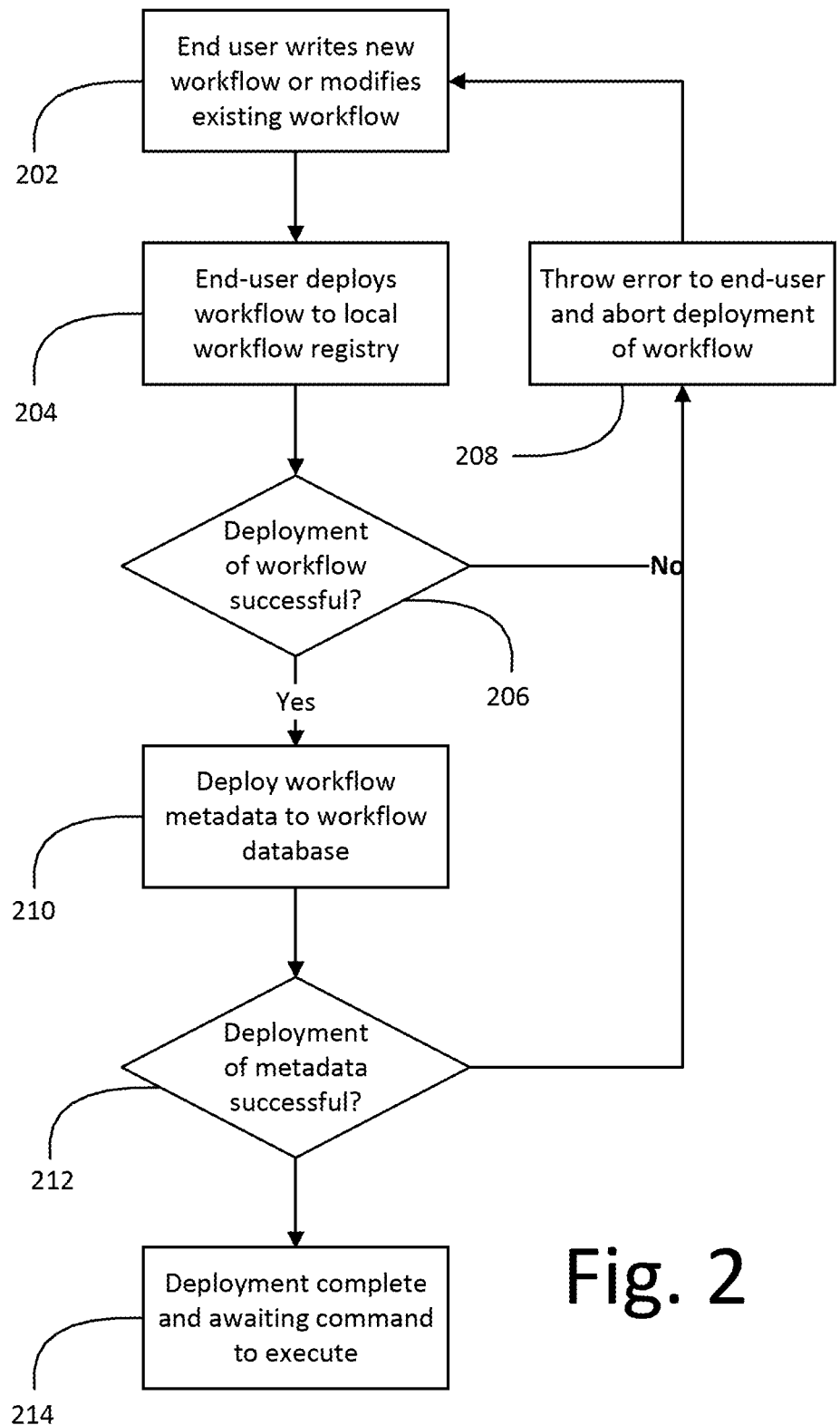
FIG. 2 presents a flow diagram illustrating a method for deployment of a workflow to local workflow infrastructure and corresponding metadata to remote workflow infrastructure according to one embodiment of the present invention.
Figure 11:
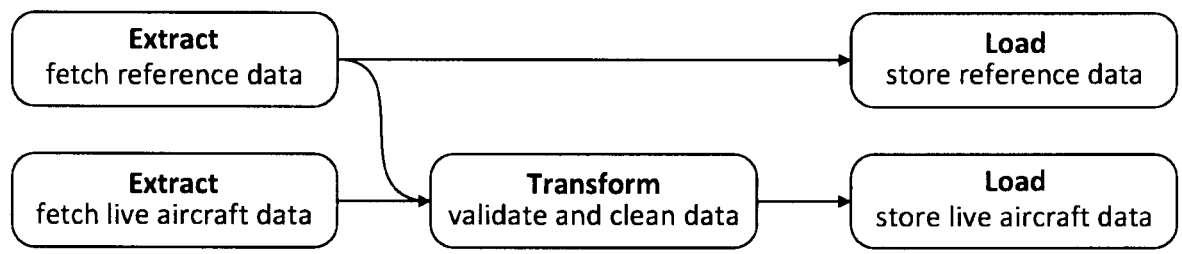
FIG. 11 presents an example workflow according to an embodiment.

FIG. 2 illustrates one embodiment of a methodology for the deployment of a workflow built by an end-user. The exemplary methodology of workflow building begins with the end-user writing a new workflow or modifying an existing workflow for redeployment on the end-user computing infrastructure, step 202. Step 202 involves the end-user writing a workflow to perform a desired set of tasks, which is set forth in greater detail in the use-case presented herein. In an exemplary ETL workflow, an end-user is trying to fetch and store information for future analysis, which may require pulling, cleaning, and merging data from multiple sources. A workflow in accordance with embodiments of the present invention allows for the end-user to arbitrarily define dependencies between tasks in a workflow when conducting extract, transform, and load operations, which includes the use of input parameters to further define the scope of or input to a given task. As such, the end user is not locked into a rigid, linear pipeline when defining a given workflow, but rather has flexibility, for example, as set forth in FIG. 11.

Once the new workflow or modification of an existing workflow is complete, the end-user deploys the workflow to the local workflow registry, step 204, which is part of the local workflow infrastructure and typically under the control of the end-user.

A check is performed to determine if deployment of the workflow to the workflow registry was successful, step 206. Where the check determines that deployment of the workflow to the workflow registry was unsuccessful, the system throws an error to the end user reporting the error state and aborts deployment of the workflow, step 208. Program flow at this point may terminate or return to step 202 with the end-user modifying and errors in the workflow, step 202, or attempting retransmission of the workflow to the workflow registry, step 204.

Once transmission of the workflow, e.g., the actual program code, binaries, dependencies, etc. are successfully stored at the workflow registry, step 206, the workflow administrator agent attempts to deploy metadata for the given workflow, e.g., the data that describes the structure of the workflow, where the workflow is stored in the local workflow infrastructure and the manner in which to properly execute the workflow, to the workflow database, step 210. Similar to step 2016, a check is performed to determine if deployment of the workflow to the workflow database was successful, step 212. Where the check determines that deployment of the workflow to the workflow database was unsuccessful, the system throws an error to the end user reporting the error state and aborts deployment of the workflow, step 208. Where the metadata successfully transmits to the workflow database, deployment is complete and the workflow agent and workflow engine await instructions from the workflow administrator to execute the workflow, step 214.

Workflow Execution

Figure 3:
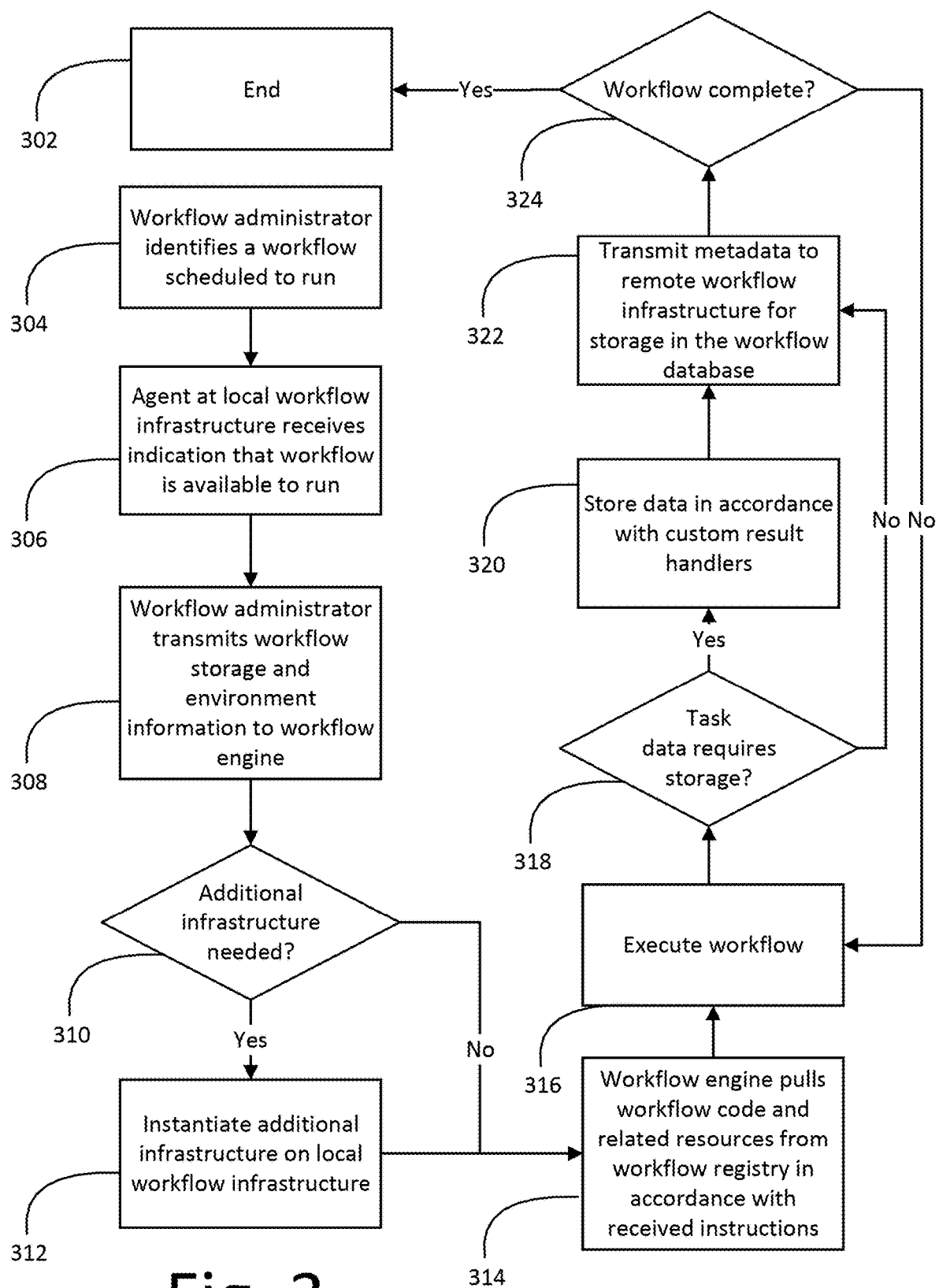
FIG. 3 presents a flow diagram illustrating a method for executing a workflow according to one embodiment of the present invention.

Workflow execution may begin with the workflow administrator running on the remote workflow infrastructure identifying a workflow to run, step 304, as set forth in the exemplary program flow execution that FIG. 3 illustrates. In accordance with the embodiment of FIG. 3, a workflow metadata may identify a schedule according to which the workflow is to be executed. If a workflow has a schedule, then the workflow administrator can automatically create new workflow runs in accordance with that schedule. Scheduling is nothing more than a convenient way to generate new workflow runs; end-users can still create ad-hoc runs alongside the auto-scheduled ones (even if they have the same start time). The only difference is that auto-scheduled runs may have an 'auto_scheduled=True' flag set according to certain embodiments.

The workflow administrator may mark a workflow as ready for execution, which may comprise the workflow administrator placing the workflow in a queue. The agent at the local workflow infrastructure periodically polls the workflow administrator by way of the API server, which forms a communications pathway between a workflow administrator agent and the workflow administrator, until it receives a signal that indicates a workflow is available for execution, step 306. When the workflow administrator agent is ready to pick-up the workflow that is available for execution, the workflow administrator transmits workflow storage and environment information to the workflow engine, step 308. The transmission of workflow storage and environment information may comprise receipt of such information by the workflow administrator agent prior to interfacing with the workflow engine.

The agent is a small process executed on the local workflow infrastructure to orchestrate the local execution of one or more workflows and are operative to run in any environment in which the workflow engine is installed. The agent helps implement the hybrid approach to workflow execution described throughout the present specification, which means that workflow execution resides inside the local workflow infrastructure, e.g., the customer infrastructure, and only sends request out to the remote workflow infrastructure. All components of the present invention follow the communication paradigm.

Agents can optionally run a private HTTP server for use as a health check service. Health checks can be used by common orchestration services, e.g., supervisord, docker, kubernetes, etc., to check that a given agent is running properly and take actions (such as restarting the agent) if it is not. If enabled, embodiments provide that the HTTP health check data be available via a specific path at the configured agent address. This route returns a given value, e.g., 200 OK, if the agent is running and healthy; otherwise the HTTP server returns an error.

A check is performed at the local workflow infrastructure to determine if additional infrastructure is needed to complete execution of the currently workflow, step 310. Where the check at step 310 evaluates to true, program flow is directed to step 312, the workflow engine, which may act under the control of the workflow administrator agent, instantiates additional infrastructure at the local workflow infrastructure that is necessary for proper completion of the workflow under execution.

Regardless of the output of the evaluation performed at step 310, program flow ultimately advances to the point where the workflow administrator agent instructs the workflow engine to pull the workflow code and related resources the workflow registry in accordance with instructions identified in the metadata, step 314. Once the workflow engine has access to the workflow program code and any required resources upon which the workflow depends, the workflow engine executes the workflow, step 316.

According to certain embodiments, workflow execution, step 316, takes place in accordance with a schedule. In such embodiments, scheduler information can be sent to the remote workflow infrastructure as metadata associated with a given workflow that identifies timing information for the execution of the given workflow. As recognized by those of skill in the art, scheduling is useful to automate the execution of workflows at certain times. Schedules can be simple schedules or complex multi-component schedules. Complex schedules in accordance with one embodiment define a clock (that emits workflow execution events as a certain time or time interval), filters (that decide whether a workflow should be included or not when executing, e.g., on_date, on_datetime, at_time, etc.) and adjustments (to make modifications to workflows that pass a filter, e.g., adding a time interval, advancing to the next or future day of the week, etc.). These three components allow users to combine simple functions into complex behavior. The use of schedule metadata to coordinate scheduling the execution of one or more workflows is described in greater detail in connection with FIG. 5.

During execution of the workflow, a check is performed to determine if any data from the task currently being executed requires storage, step 318. Where task data requires storage, e.g., the output of a task requires some degree of persistence as it may be relied upon by one or more downstream processes, the data may be stored in accordance with custom result handlers that the end-user programs as part of the workflow, step 320. Regardless of whether any task data requires storage, the workflow engine transmits state change information to the workflow administrator as metadata for storage in the workflow database, step 322, with substantive data that the metadata describes stored in the workflow registry or otherwise as part of the local workflow infrastructure.

With respect to data handling, the hybrid execution model described herein in conjunction with various embodiments of the present invention allow customer control of both code and data, ensuring that neither leave the internal ecosystem of the customer. Data as referenced herein refers to one or more inputs and/or outputs from tasks comprising a given workflow. As described herein, all workflow execution takes places within the customer infrastructure, e.g., using network and computing resources under the control of the customer while maintaining the integrity of the customer network.

Data persistence may be handed on a per-workflow basis. Alternatively, or in conjunction with the foregoing, data persistence may be handed on a task-by-task basis within a given workflow. Regardless, persistence occurs when a workflow must write data for later access, which may occur, for example, in conjunction with task retries (result methods are called on one or more upstream inputs to the retrying task), task queues (equivalent to retries, but occurs whenever a task hits a concurrency limit), task caching (where a task is set to cache its own result). All workflow execution, including the invocation of writing data for persistence by specific tasks, takes place on customer infrastructure with no customer code executed on remote or cloud infrastructure.

Subsequent to the storage of any output data, as well as transmission of any metadata comprising any descriptions regarding the same, a check is performed to determine if the workflow is complete, step 324. Where the workflow is not complete, e.g., there are additional tasks or additional processing that the workflow defines and require completion, program flow returns to step 316 with the workflow engine continuing the execution of the workflow, e.g., execution of the next task that the workflow defines. Alternatively, processing completes and the routine ends, step 302.

Workflow Execution

Figure 4:
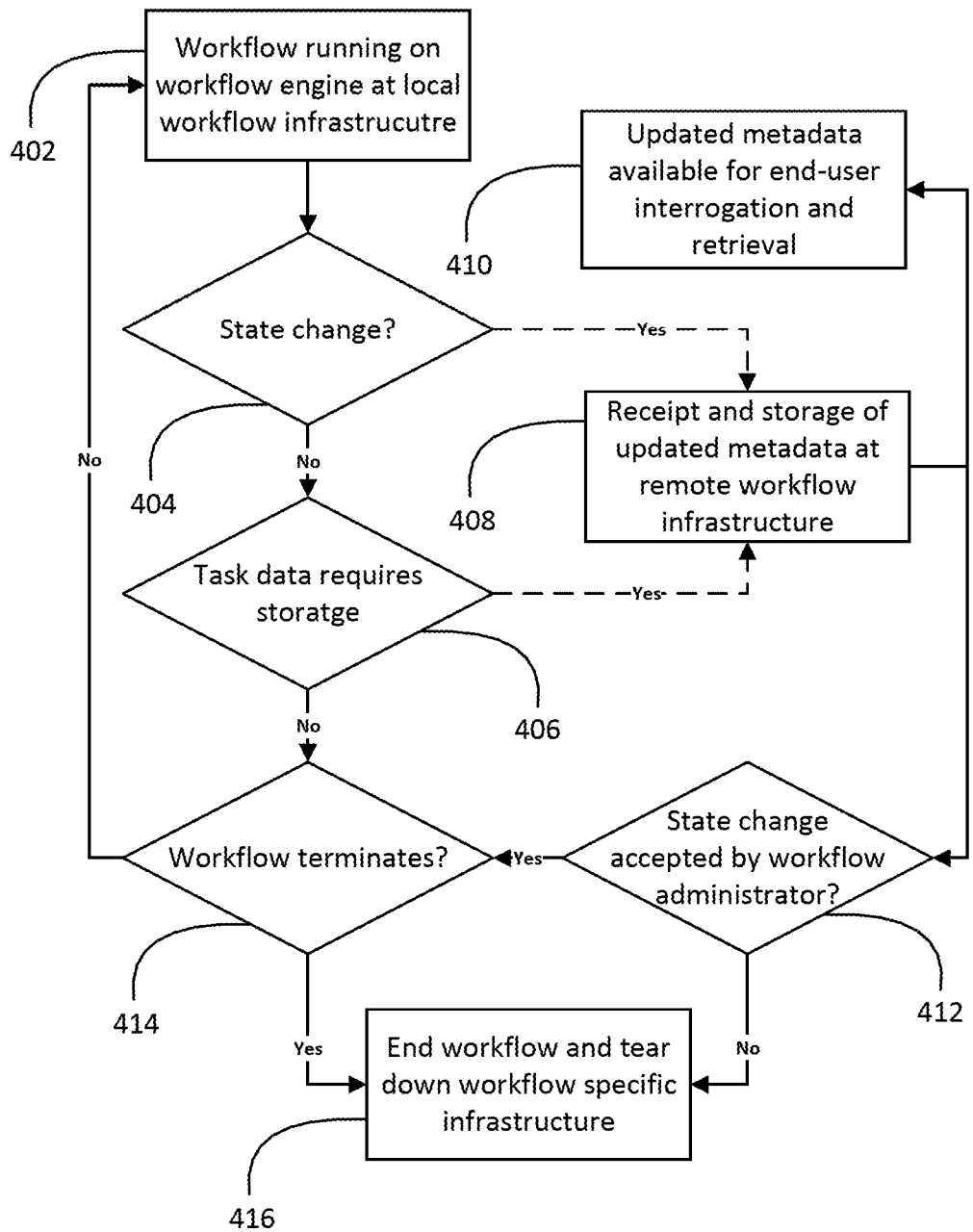
FIG. 4 presents a flow diagram illustrating a method for running a workflow according to one embodiment of the present invention.

FIG. 4 presents a flow diagram illustrating one embodiment of a method for monitoring and interacting with workflows being run by the workflow engine on the end-user computing infrastructure. In accordance with the methodology of FIG. 4, a workflow is running on the workflow engine at the local workflow infrastructure, step 402. As the workflow engine executes the given workflow, it performs a check to determine if processing the workflow has resulted in a state change, step 404. Similarly, possible in parallel according to certain embodiments, the workflow engine performs a check to determine if a currently executing task requires storage, e.g., in the workflow registry on another location on the end-user computing infrastructure, step 406.

If the workflow engine determines that there is either a state change, step 404, or the workflow is storing output data, step 406, the workflow engine generates metadata describing the event. The workflow manager receives the metadata, which it stores in the workflow database as updated metadata associated with the workflow, and possibly the specific task, step 408. This step 408 takes place out of process with the remaining steps of the method, as indicated by the broken lines connected steps 404, 406 and 408.

According to one embodiment, data in the workflow database is exposed as a full GraphQL API for querying the metadata contained therein. All data in the workflow database may be queried via GraphQL. As such, updated metadata is made available for end-user interrogation and retrieval, step 410. For example, the query illustrated in Table 1 below retrieves all workflows whose names end with "flow"; the state of their most recent workflow run; and the state history of five of that run's task runs, ordered alphabetically.

TABLE 1

```
"'graphql
query {
    flow(where: { name: { _ilike: "%flow" } }) {
        id
        name
        flow_run(order_by: { start_time: desc }, limit: 1) {
            id
            state
            task_run(limit: 5, order_by: { name: asc }) {
                states {
                    timestamp
                    state
                }
            }
        }
    }
}
```

After performing checks to determine data updates, steps 404 and 406, another check is performed to determine if the state change was accepted or if such change resulted in an error state, step 412. Where the state change is not accepted, the workflow enters an error state, which causes the workflow to terminate and the workflow engine to tear down any workflow specific infrastructure that was instantiated to support execution of the workflow, step 416. Where the state change updates are accepted and the workflow does not enter an error state, a check is performed to determine if the workflow is in a termination state, step 414, e.g., all tasks that the workflow identifies are complete. Where the workflow is in a termination state, the workflow engine to tears down any workflow specific infrastructure that was instantiated to support execution of the workflow, step 416. Where state changes are accepted, step 412, and the workflow is not in a termination state, program flow returns to step 402 with the workflow continuing to run on the workflow engine at the local workflow infrastructure.

Metadata

As set forth herein, metadata provides an abstraction to allow the description of one or more specific workflows defined at the local workflow infrastructure, which allows remote execution and state maintenance without knowledge of private customer data or infrastructure specifics. More specifically, the pieces of metadata programmatically surrounding workflow objects are crucial to the hybrid execution model in that they allow the orchestration of end-user workflows (to define state, status, etc.) without ever requiring communication out to customer infrastructure. This can take place, for example, through a series of well-crafted polling operations, whereby a given workflow initiates communication with the workflow administrator via the API server for information regarding the manner in which the workflow is to proceed, e.g., based on the state of one or more other tasks comprising the workflow.

Various types of available metadata are useful for describing disparate aspects of a workflow including, but not limited to, aspects such as workflow structure through tasks and edges, state information, workflow storage and execution steps, etc. State information is the particular item of metadata that allows the workflow administrator to remotely orchestrate flows securely taking place on end-user computing infrastructure. For example, when a workflow completes a task, the workflow administrator agent communicates this state metadata back to the workflow manager via the API server. Similarly, when any downstream tasks in a given workflow begin, each may query the API server to enquire as to the status of any computations or output that are conditions precedent to further processing, i.e., is the state of any tasks that a given task depends on successfully complete. This process of reporting and querying state information enables features such as dynamic task execution, parallel workflow runs, manual intervention, deadlock prevention, and other computing benefits that are apparent to one of ordinary skill in the art.

Figure 5:
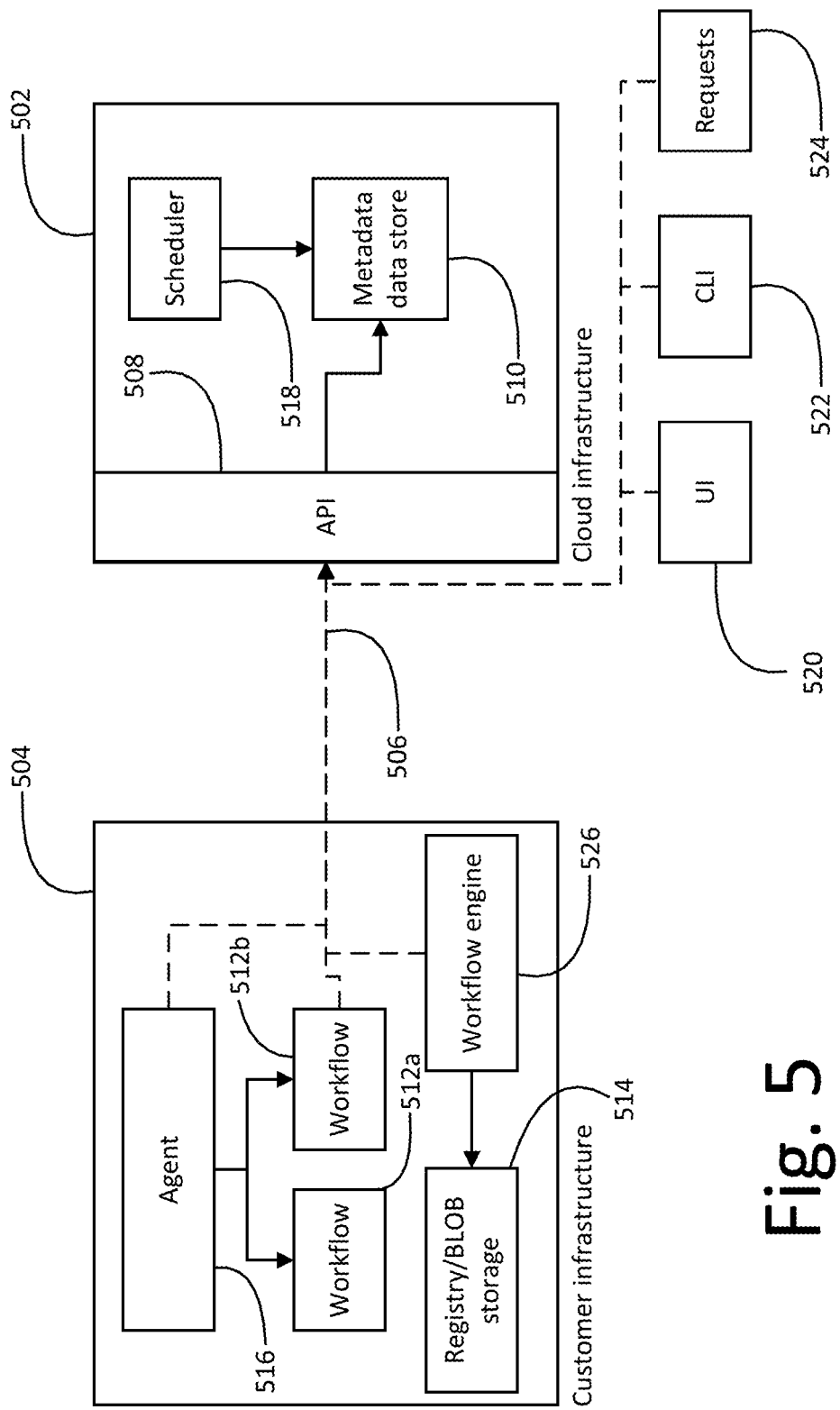
FIG. 5 presents a block diagram illustrating an alternative system for the remote execution of one or arbitrarily defined workflows according to one embodiment of the present invention.

FIG. 5 illustrates an alternative implementation of a system for hybrid deployment of workflow execution in accordance with one embodiment of the present invention. Like the embodiment of FIG. 1, the embodiment of FIG. 5 provides the convenience of a cloud platform with the security of an internal, on-premises workflow management solution. In accordance with the communication flow that FIG. 5 illustrates, the cloud infrastructure 502 receives requests from customer infrastructure 504 as metadata 506 via its API 508. Having a rich set of metadata 510 at the cloud infrastructure allows for the orchestration of workflows without possessing any knowledge with respect to the underlying code or resources. Table 2 presents illustrative pseudocode in accordance with one embodiment of the present invention for the implementation of an exemplary workflow:

TABLE 2

```
with Flow(
    "Map / Reduce",
    storage=Docker(registry_url="my_registry_url",
image_name="my_image_name"),
    environment=RemoteEnvironment(
        executor="prefect.engine.executors.DaskExecutor",
        executor_kwargs={"address": "tcp://dask-scheduler:8786"},
    ),
) as flow:
    numbers = numbers_task( )
    first_map = map_task.map(numbers)
    second_map = map_task.map(first_map)
    reduction = reduce_task(second_map)
```

As illustrated by the above-defined pseudocode from Table 2, a workflow 512a and 512b generates a list of number up to N, maps twice of the number to add one to each, reduces the list of numbers to a final summation, and then logs the summation. Two key pieces of information contained in the workflow are attributes "storage" and "environment". Storage specifies where the developer stores the actual business logic 514 for the workflow 512a and 512b. This can range anywhere from Docker (www.docker.com) registries, to S3 object storage (aws.amazon.com/s3), to a local or remote filesystem, etc. In accordance with the present example, the system is using Docker to store the actual business logic comprising the workflow. Those of skill in the art recognize that any filesystem operative to or capable of storing files, BLOBs, or any arbitrary digital content is contemplated as falling within the scope of various embodiments of the present invention. The Environment is a way of specifying how the developer wish the workflow to execute and what infrastructural needs the workflow may have. In this example, the developer is utilizing a static Dask for execution of the workflow.

Once a developer defines a workflow 512a and 512b, he or she must register the workflow 512a and 512b with the cloud infrastructure 502, which involves hybrid communication as extensively described herein. Accordingly, none of the actual business logic 514 comprising the workflow 512a and 512b is sent to cloud infrastructure, instead only metadata representing the structure of the workflow is exchanged therebetween. The Docker storage identified in the workflow of Table 2 is responsible for keeping the actual workflow code, while the metadata is sent to the cloud infrastructure. Upon receipt of the metadata at the cloud infrastructure, the system may register the workflow and specify a project to which the workflow belongs. Metadata is the only information that the cloud infrastructure receives with regard to a given workflow, which comprises information regarding the general structure of a workflow and where the system stores the workflow. Knowing the location of where a workflow is stored means that the cloud infrastructure neither knows about the contents of the workflow nor has the permission to access such code and data.

Upon registration of a workflow with the cloud infrastructure 502, the customer infrastructure 504 instantiates one or more agents 516, which may include instantiation on any arbitrary platform that the customer or its developers choose. For example, the customer may choose to deploy an agent 516 as a Kubernetes Agent, which is an agent designed to interact directly with a Kubernetes API server to run workflows as jobs on a Kubernetes cluster. Other agent platforms also fall within the scope of various embodiments of the present invention and are intended to be interchangeable based on the specific needs of the workflow that the developer is authoring, e.g., AWS Fargate clusters.

A given agent 516 is responsible for polling cloud infrastructure 502 via the API 508 to identify workflows written to the metadata data store 510 that are scheduled for execution, which may be identified by a scheduler 518 component that may be located as part of or remote to the cloud infrastructure 502. This satisfies one requirement that the embodiments of the present invention be designed to satisfy: being able to orchestrate customer workflows inside of customer owned and operated infrastructure 504. The hurdle is completely removed by the cloud infrastructure 502 never talking to user infrastructure 504 at all; instead, the customer infrastructure 504 initiates requests for work via the API 508. Once work is found, the agent 516 will run the workflow on its relevant platform of choice. According to one embodiment, the agent 516 periodically polls the scheduler 518 via the API 508 to identify any workflows that are scheduled to run. Where the scheduler 518 is not utilized, a given workflow can be executed in the customer infrastructure 504 by issuing a command to run a given workflow through the a user interface 520 to the cloud infrastructure, a command line interface 522 to the cloud infrastructure, or programmatically sending requests 524 directly to the API 508.

The agent 516 queries the scheduler 518 via the API 508 to determine that a workflow is scheduled for execution by the workflow engine 526, which according to one embodiment is communicated by placing metadata for the workflow stored in the metadata data store to a "scheduled" state. Once the agent 516 picks up the workflow for execution by the workflow engine 526, the agent updates the workflow state to "submitted", which is also sent to the cloud infrastructure for storage in the metadata data store 510. This helps ensure that only one agent 516 selects an available workflow 512a and 512b for execution. According to one embodiment, the agent 516 continues to poll the scheduler 518 for workflows requiring execution while it begins execution of its current workflow.

Once a workflow is running in the workflow engine 526 using the environment specified in the workflow 512a and 512b the agent 516 begins communicating state updates back to the cloud infrastructure via the API 508 for storage in the metadata data store 510. An exemplary task state pipeline for a given workflow would look like: Pending-→Running→Success. Table 3 below presents exemplary metadata state objects that according to one embodiment are sent to the cloud infrastructure 502 for storage in the metadata data store 510:

TABLE 3

```
{
    "message":null,
    "cached_inputs":{
    },
    "_result":{
        "___version___":"0.9.4",
        "type":"NoResultType"
    },
    "context":{
    },
    "___version___":"0.9.4",
    "type":"Running"
}
```

State metadata such as the exemplary metadata of Table 3 can be used for a number of purposes including, but not limited to ensuring idempotency, reporting status, building visualizations, providing analysis, etc. Once the run of the workflow is complete, the workflow via the workflow engine 526 reports its final state hack to the cloud infrastructure, which may result in entry of a status of "completed". As such, embodiments of the present invention provide the customer with the ability to utilize the cloud infrastructure to orchestrate execution of a workflow inside the customer infrastructure without the cloud infrastructure ever reaching into customer infrastructure or knowing about the contents of the workflow.

A Generic Workflow Use-Case

As with most use-cases built upon the systems and methods disclosed herein, the process typically begins with workflow instantiation. For example, suppose a developer working within a customer environment of infrastructure has two tasks ("Task A" and "Task B") that he or she wishes to orchestrate via the remote API, e.g., via the API provided by the API server 118 from FIG. 1. Suppose further that the first task, Task A, provides a piece of private data to the second task, Task B, in order for the second task to achieve its desired outcome, which may be any arbitrary outcome within the customer environment that is the desired outcome of executing the workflow. After writing the code defining these tasks, the user needs to configure or otherwise identify several additional pieces of configuration specific to the API:

Given the processing requirements of Task A, a "result" configuration specifying where Task A should store its data; examples of such intermediate storage locations may include, but are not limited to, cloud storage, a local storage device within the customer environment, etc. Importantly, the identification of this storage location is completely within the discretion and control of the developer, e.g., he or she can ensure that such transient or intermediary data never leaves the customer environment.

A "storage" configuration for the workflow; similar to the result configuration, this is location in which the developer may actually save his or her code that defines the steps comprising workflow and processes associated therewith. Analogous to the result configuration, this location is fully within the control and discretion of the developer; such location does not need to be accessed by the API service directly.

With this configuration in place, the developer now "registers" the existence of this workflow with the remote API through an API call. This registration step transmits only enough metadatato the API so as to allow a user with appropriate access to retrieve the workflow configuration and code. For example, where the developer stores the workflow configuration within a Docker registry, the registration step would only send the API metadata identifying the image name, tag, and registry URL. The API receives the metadata and registers its availability for execution.

Now that the workflow is known to exist, it can be scheduled to run. For proper execution of a given workflow, the developer needs to instantiate an "agent" process within the client environment that has access to both the remote API, as well as the result and storage locations identified by the developer during configuration and instantiation of the workflow. The customer runs this process within his or her infrastructure and can configure access controls in accordance with any acceptable levels of risk. The agent is operative to poll the remote API to learn of scheduled work, which, once found, causes the API to provide the metadata described above instructing the agent where it can find the code for execution of the workflow. Provided with this data, the agent accesses the code and submits it for execution within the customer infrastructure. Note, as is the case with other embodiments, the remote API does not need access to the customer infrastructure, but instead the agent serves as a secure, internal middle-man between the API and the private infrastructure of the customer.

As the code runs, it may report back status updates to the API (e.g., "I'm still running", "I did not finish successfully", etc.). In accordance with the present use-case, when Task A completes and produces the private data, the result configuration stores the data within the customer infrastructure and informs the API of the location, which in accordance with certain embodiments might simply be a filename, although complex location identifiers are contemplated as falling within the scope of embodiments of the invention. As with storage, the critical aspect is that the result configuration provides sufficient information so that a developer with appropriate access credentials could retrieve the data. The data is then provided to Task B, which runs similarly to A. If Task B fails, or is re-run in the future, it can pull the data that Task A produced from the appropriate location as it is running in a permissioned environment within the control of the developer. As such, the remote API now has a record of the run of Task A and Task B, as well as any relevant issues that arose along the during execution of either task, all without ever requiring actual access to the private infrastructure of the customer utilizing the workflow execution services provided herein. Outside of configuration, the only requirement placed on the customer infrastructure so as to allow for workflow automation in accordance with the various embodiments of the invention is that the customer infrastructure is operative or otherwise capable of communicating outward with location hosting the API and related resources.

A Specific Workflow Use-Case

By way of a specific use-case that illustrates one embodiment of an application of the foregoing disclosure, assume that a customer or other end-user wishes to automate an arbitrary workflow that runs every night at midnight. The exemplary workflow downloads data from a site, process the data, and then inserts the processed data into a row in a table in a relational database residing on infrastructure operated or otherwise controlled by the customer.

The customer first installs necessary components in the local workflow infrastructure, which provide for the authoring and execution of workflows on the end-user computing infrastructure. The end-user utilizes these components to programmatically build a workflow or "Flow" object that contains three "Tasks" and in which users provide custom "run" functions that describe the behavior of the task when it is executed by the workflow engine. In the exemplary workflow, the three tasks would have "run" functions or business logic that downloads data, process the downloaded data, and insert the processed data, respectively. The following what this exemplary workflow might look like in pseudocode, using some convenience methods that makes writing tasks as simple as possible:

```
from prefect import Flow, task
@task
def    download_data( ):
       data = get_data( )
       return data
@task
def    process_data(data):
       processed_data = process_data(data)
       return processed_data
@task
def    store_data(data):
       store_data(data)
with Flow( ) as flow:
       downloaded = download_data( )
       processed = process_data(data=downloaded)
       store_data(data=processed)
```

Notice that each task is calling out to some other function (which is not defined herein). Users can put any business logic inside the task; the workflow engine is agnostic as long as it meets some simple contracts around what inputs the program code expects and outputs it returns.

When the workflow administrator calls the functions at the bottom of the workflow (in the "flow" block), the application is not actually running the functions, but rather as described herein are actually running on the customer computing infrastructure under the control of the workflow engine. Instead, the workflow manager may observe the calls and build up a computational graph. For example, after the first call ("downloaded=download_data( )"), the workflow manager knows that the "download" task is part of the workflow. In the second line, the program code passes that task to another task ("process_data") and the workflow administrator learns that those two tasks are connected in the computational graph, and how data moves there between.

When executing the workflow on the remote workflow infrastructure, a number of events happen automatically in the present specific embodiment:

a Docker container is built that contains the workflow the customer previously built, which allows the workflow manager to instantiate this exact script and instruct workflow engine to run the workflow at a future time;

The container is stored in a Docker registry controlled by the customer. Since this script is run on the customer or local workflow infrastructure, not the remote or cloud workflow infrastructure, this means that at no time is the workflow program code going to third parties or otherwise leaving the control of the customer; and A JSON document that describes the computational graph, but not its code, is generated and sent to the remote or cloud workflow infrastructure for storage in the workflow database. From this document, the workflow administrator can reconstruct the workflow and all its constituent tasks in a "dummy" form—these dummy workflows have the same names, ids, schedules, connections, etc., but not the critical run( ) function.

A subsequent step to be performed in accordance with this hybrid architecture is creation of an environment in which to execute the workflow. According to one embodiment, the local workflow infrastructure hosts an execution cluster that is capable of deploying the container built earlier. On that cluster, is installed the workflow administrator agent, which continuously polls the workflow administrator via the API server to see if any workflows should be run. If agent finds a workflow to run, it launches the appropriate container that it provisions with an authentication token so the container can communicate its progress back to the workflow administrator.

From the point of view of the customer, the following is now possible:

1) He or she can log into the workflow administrator, to see (among other things) available workflows and histories of their runs, with such data being provided to the customer via a GUI.

2) The workflow initially built by the customer can be navigated to, and the workflow administrator can be instructed to run it or other workflows.

3) The workflow administrator puts the dummy workflow in a "scheduled" state, which is the event for which the agent is monitoring. When an agent sees the scheduled workflow, the workflow engine launches the code and communicates progress back to the workflow administrator via the API sever, allowing the end-user to see three tasks get created, run, and (hopefully) finish in a successful state.

When the agent deploys the container, it is simply running workflow engine on the local workflow infrastructure with hooks turned on so that the workflow engine retrieves up-to-date task state information from the workflow administrator, reporting any changes to those states. This provides some advantages over using the workflow engine alone. For example, suppose one of the tasks failed and needed to be retried. It would enter a "retry" state with a desired start time. The workflow manager and the agent may detect when that state time has passed, automatically kicking off the workflow engine with up-to-date information, including that task's Retrying state. The workflow engine may then handle the task appropriately given the updated state information that it is provided.

Mimicking this behavior without the remote workflow infrastructure is possible but requires storing the "retry" state in a persistence layer, introspecting the state to understand the start time, running processes to properly restart the workflow at the correct time, providing an authenticated API to allow stored state information to be updated, and then providing it and all other states to the workflow engine. In this way, the remote workflow infrastructure is not simply a "managed version" of the workflow engine, but rather provides administrative and stateful features that ultimately provide structures that improve the function and operation of the workflow engine. Indeed, the hybrid workflow orchestration model described herein satisfies the need in the art by providing a bifurcation of data and code execution on the one hand, which is tightly bound to and within the control of the customer infrastructure, and orchestration, error surfacing, scheduling, and monitoring on the other hand, which resides in remote cloud structure.

Figure 6:
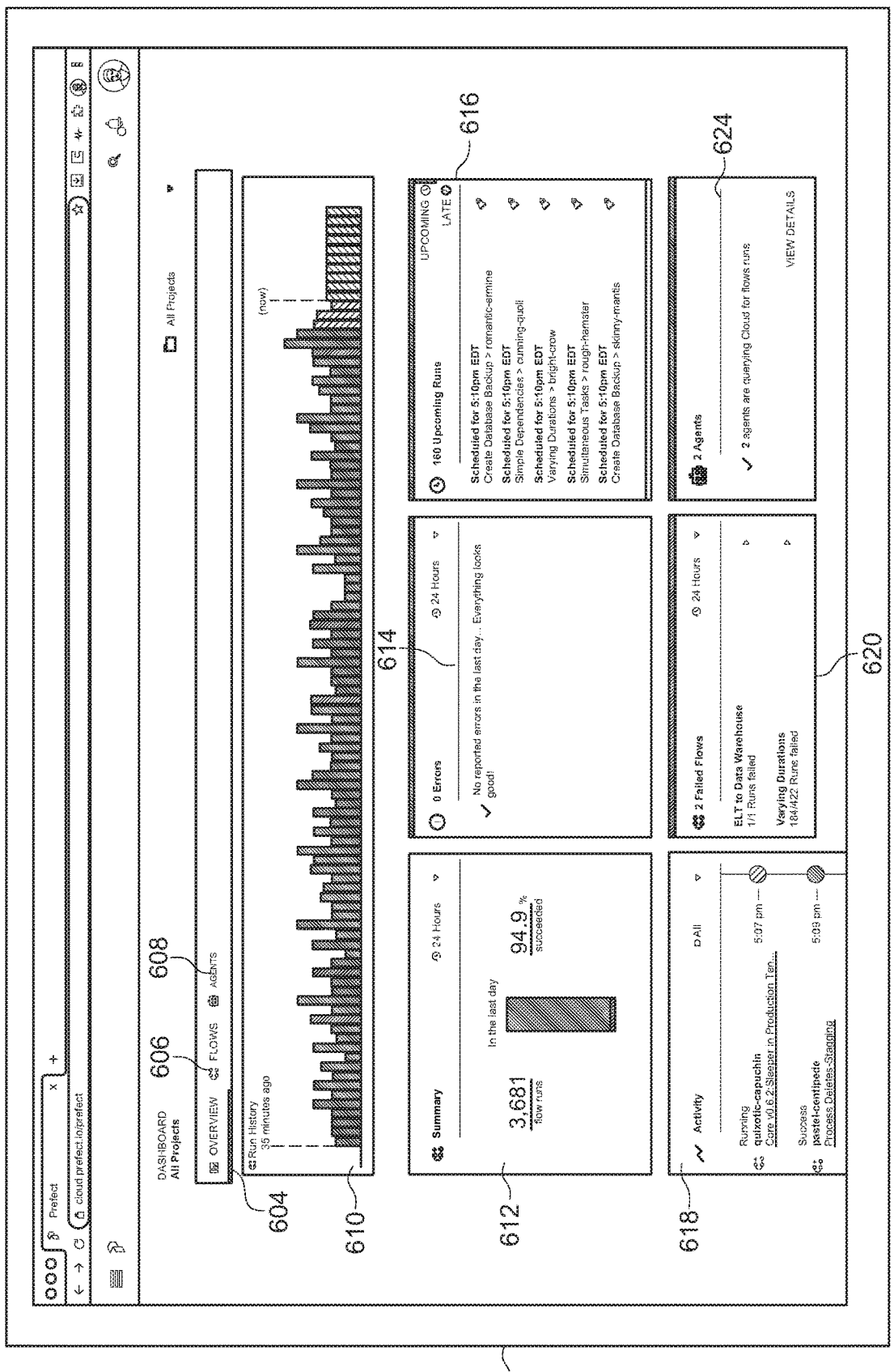
FIGS. 6 through 10 present a series of screen diagrams illustrating one embodiment of user interfaces for managing the hardware and software components deployed inconjunction with various embodiments of the present invention.

Embodiments of the invention that have been described heretofore may be exposed to end-users and administrators as a software as a service ("SaaS") platform, allowing such parties to easily deploy and execute the workflow automation aspects of embodiments. For example, FIG. 6 illustrates a web interface 602 that presents a management dashboard providing details on the workflow management environment of the customer. Through the dashboard 602, the customer may view overall information regarding a project 604 (e.g., one or more workflows and associated tasks), as well as detailed information with respect to previously defined workflows 606 and agents 608 that are operating on the customer infrastructure. The exemplary dashboard UI 602 of FIG. 6 presents a number of information panels that are associated with one or more pieces of program code that are operative to query underlying data sources and present resultant information for display. For example, such information panels may include, but are not limited to, a UI to visualize the overall result history of zero or more workflow runs 610, rolled-up summary information with respect to aggregate workflow execution 612, any reported error information 614, identification of workflows that are scheduled for future execution 616, generalized activity information 618, details with respect to any failed workflow runs 620 and an identification of active agent that the customer has deployed on the local or customer infrastructure 624.

Figure 7:
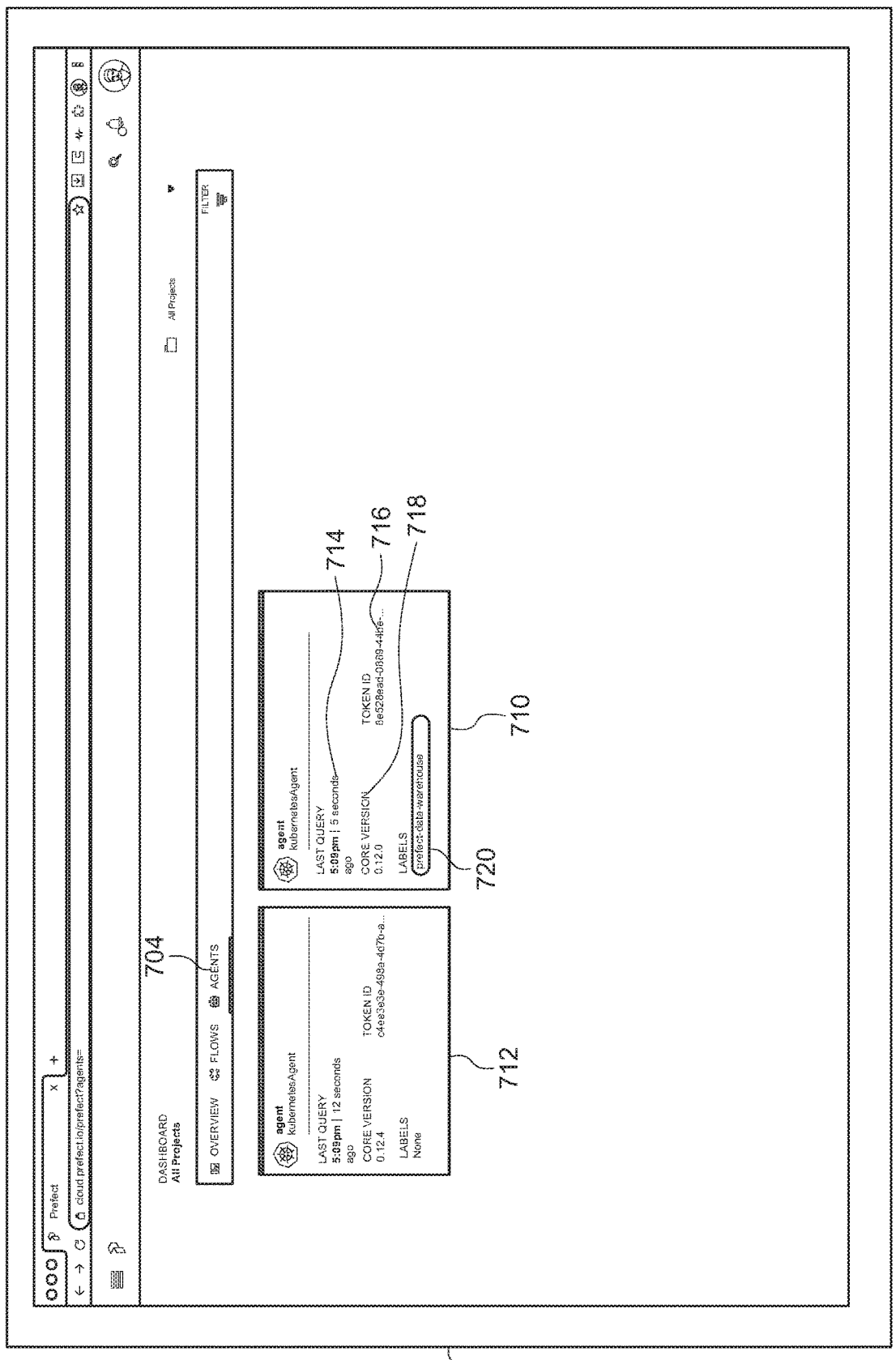

As described above, embodiments of the dashboard of FIG. 6 comprise controls to present a UI to allow the customer to view, interact with, and manage zero or more remote agents, which may be limited to those remote agents that are currently connected. In the example of FIG. 7, the agents tab 704 is selected, which results in the dashboard 702 accessing software components and data storage described in conjunction with various embodiments of the present invention to present information regarding zero or more defined agents, with the UI displaying a given agent in a separate panel UI element. In the exemplary embodiment, two panel UI elements present information regarding a first agent 710 and a second agent 712. Agent information that the dashboard 702 displays to the customer includes, but is not limited to, information regarding the last time and elapsed time since the agent was last run 714, version information for the workflow engine with which the agent is working 716, security token identification information 718, and controls to view data one or more data stores 720.

Figure 8:
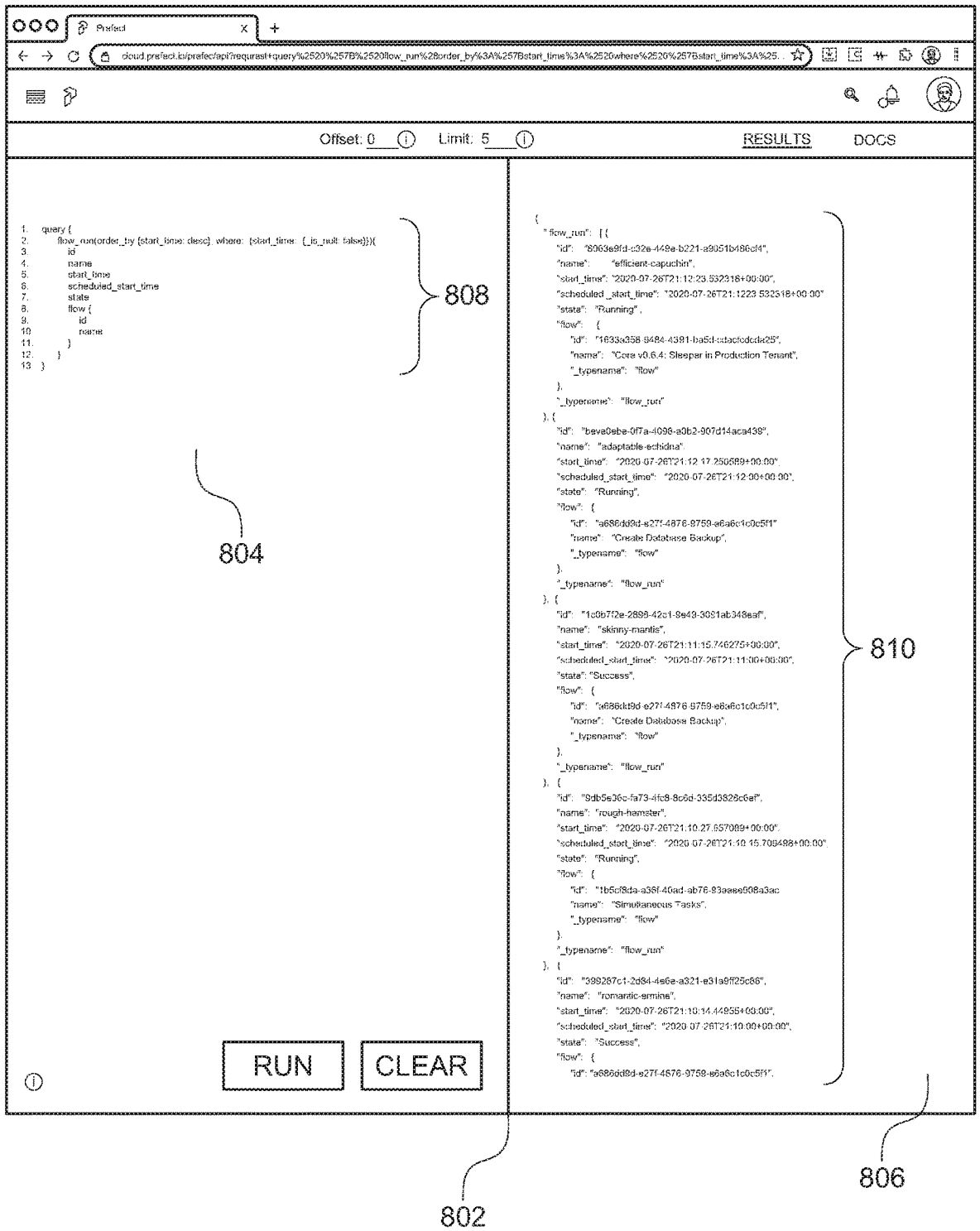

FIG. 8 presents an exemplary UI for an interactive API, such as the API described herein with respect to the remote or cloud infrastructure. In accordance with the UI 802 of FIG. 8, the interactive API presents a split-panel interface that comprise a query building panel 804 and an interactive results panel 806. In use, a user who wishes to run a query against a data store may provide the program code comprising the query 808 in the query builder panel 804. Program code (not pictured) underlying the query builder panel 804 packages program code comprising the query 808 for evaluation or execution by the API which returns a result set that is received by program code underlying the interactive results panel for display 810.

Figure 9:
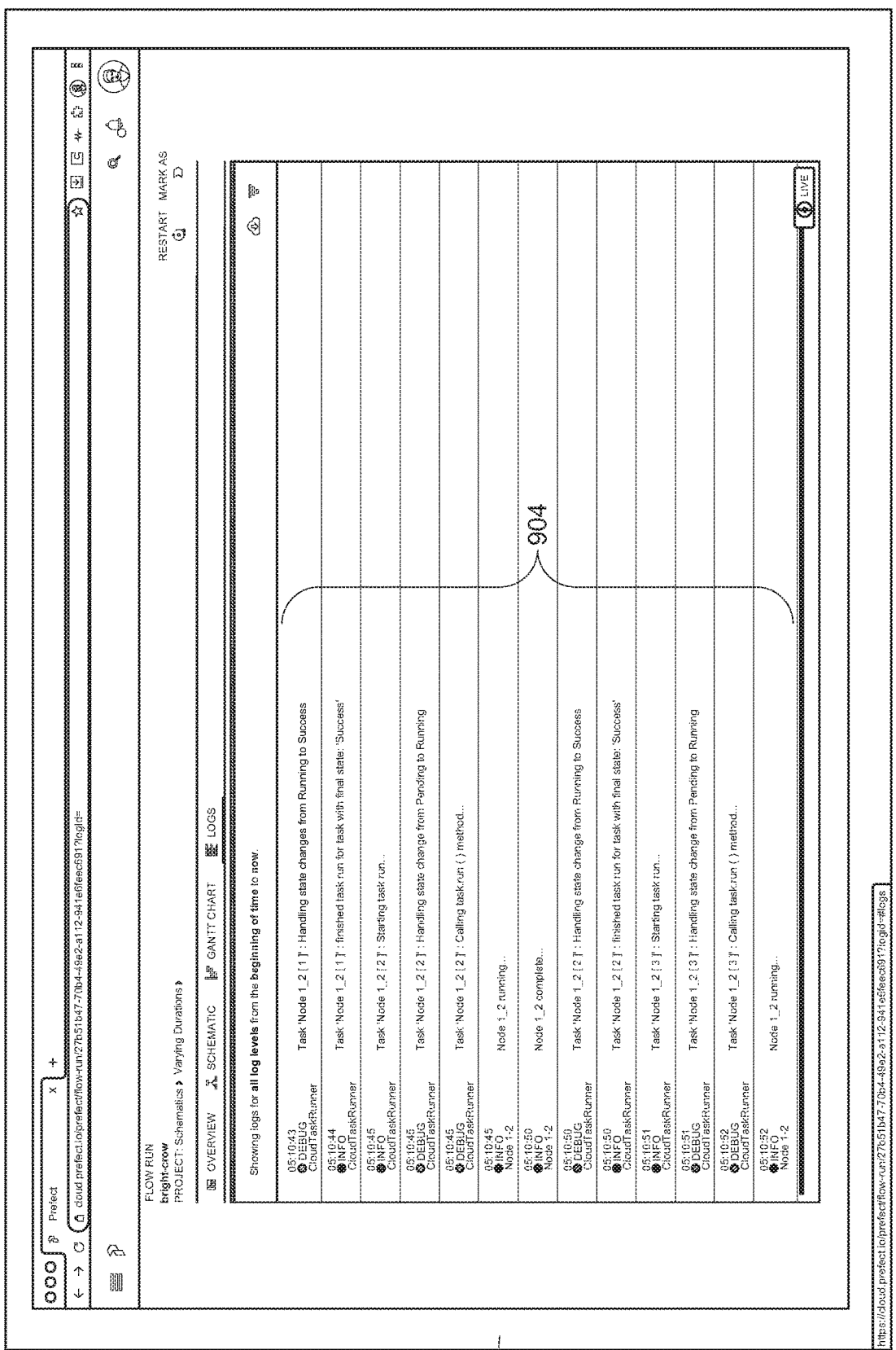

As par of workflow execution, embodiments of the present invention comprise logging functionality to keep track of successful task execution, as well as any issues that might arise from workflow execution. FIG. 9 presents a user interface 902 that provides a window to a data store that maintains logs detailing workflow execution events. In accordance with the exemplary interface 902 of FIG. 9, underlying programmatic components query the relevant data store and visualize the result set 904, which in the present embodiment is on a per-task basis with tasks interleaved from various workflows, which may or may not be interdependent.

Figure 10:
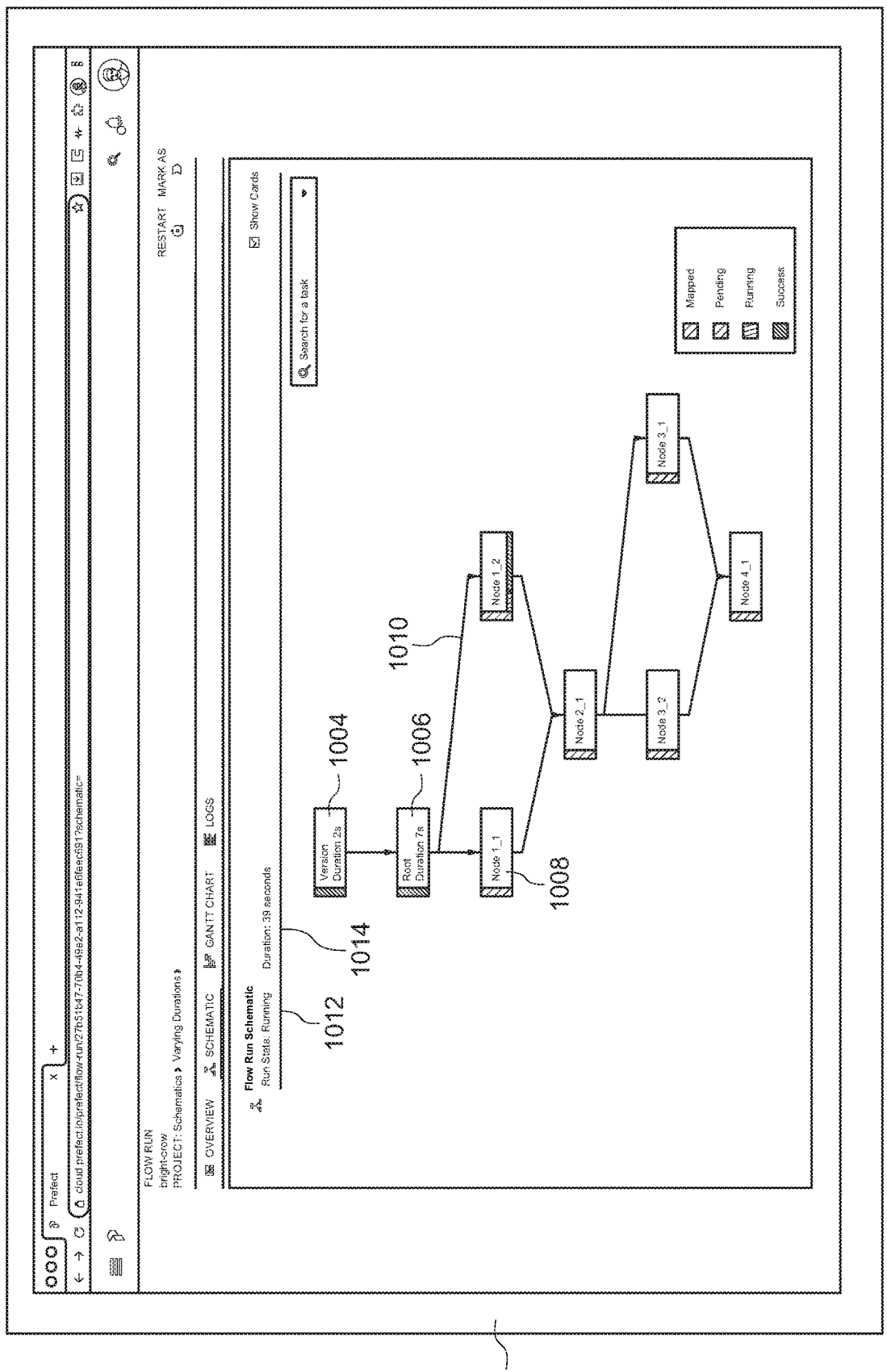

FIG. 10 presents an exemplary UI 1002 for workflow visualization engine that allows a user to visualize the tasks, e.g., 1004, 1006, and 1008 comprising workflow. In addition to tasks, an exemplary workflow also defines the relationships or dependencies 1010 that exist between any two or more given tasks. The exemplary UI 1002 illustrates an in-process tasks, which is indicated by a "run state" indicator 1012, as well as an indication as to the amount of time that transpired during execution of the current workflow 1014. Accordingly, the workflow visualization interface 1002 of FIG. 10 allows the customer or an administrator to determine task and workflow names, task and workflow states and dependencies from metadata, without the need to access customer or local infrastructure.

FIGS. 1 through 10 are conceptual illustrations allowing for an explanation of the present invention. Those of skill in the art should understand that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but rather should be defined only in accordance with the following claims and their equivalents.

We claim:

1. A system for remote execution of one or more arbitrarily defined workflows, the system comprising:
   at least one processor associated with and located in a computer-based customer infrastructure;
   at least one other processor located separate from the computer-based customer infrastructure;
   a workflow engine that is executed by at least one processor, the workflow engine being configured to be executed directly by at least one the processor associated with and located in the computer-based customer infrastructure, the workflow engine being configured to process one or more functions defined in a given workflow on a computer-based customer infrastructure;
   a workflow administrator that is executed by the at least one other processor, the workflow administrator being configured to access to a workflow database that maintains metadata that describes a state of the given workflow, the workflow administrator executing separate and remote from the workflow engine and executing by the at least one other processor separately from the computer-based customer infrastructure; and
   a workflow administrator agent that is configured to poll the workflow administrator to identify when the given workflow is in a state that is scheduled for execution and, when the given workflow is scheduled, the workflow administrator is configured to issue a command to the workflow engine;
   wherein the workflow engine is configured to retrieve, responsive to receiving the issued command, the given workflow from a workflow registry and execute the one or more functions defined in the given workflow on the computer-based customer infrastructure, the workflow administrator agent transmitting state information regarding execution of the given workflow to the workflow administrator for storage in the workflow database.

2. The system according to claim 1, comprising an Application Programming Interface (API) to receive requests and commands from the workflow administrator agent for forwarding to the workflow administrator.

3. The system of claim 2, wherein the API receives responses to requests and commands from the workflow administrator for forwarding to the workflow administrator agent.

4. The system of claim 3, wherein the workflow administrator queries the workflow database to retrieve information responsive to a request from the workflow administrator agent.

5. The system of claim 4, wherein the request from the workflow administrator agent comprises a query as to available workflows that require execution.

6. The system of claim 1, wherein the workflow registry maintains business logic as to steps that form a part of a given workflow.

7. The system of claim 1, wherein the workflow engine is remote from the computer-based customer infrastructure.

8. The system according to claim 1, wherein the workflow administrator does not have direct access to code executed in the computer-based customer infrastructure, the code being part of the given workflow.

9. The system according to claim 1, wherein the metadata comprises a code-less version of the workflow.

10. The system according to claim 9, wherein the metadata comprises at least one of the group comprising:
    at least one task contained in the given workflow;
    a dependency structure between the at least one task and another task of the given workflow;
    a schedule of execution of the given workflow; and
    information regarding a runtime environment of the given workflow.

11. A method for remote execution of one or more arbitrarily defined workflows, the method comprising:
    executing a workflow administrator agent on at least one processor associated with and located in a computer-based customer infrastructure and a workflow administrator on at least one other processor located separate from the computer-based customer infrastructure on a cloud infrastructure, the workflow administrator being separate and remote from a workflow engine;
    providing the workflow administrator with access to a workflow database that maintains metadata describing a state of a given workflow, the workflow administrator executing separate and remote from the workflow engine and executing by the at least one other processor separately from the computer-based customer infrastructure;

polling the workflow administrator by the workflow administrator agent to identify when a given workflow is in a state that is scheduled for execution, when the given workflow is scheduled for execution, issuing a command by the workflow administrator agent to the workflow engine;

retrieving, by the workflow engine responsive to receiving the issued command, the given workflow from a workflow registry and perform the one or more functions defined in the given workflow on the computer-based customer infrastructure; and transmitting, by the workflow administrator agent, state information regarding execution of the given workflow to the workflow administrator for storage in the workflow database.

12. The method according to claim 11, comprising:

receiving requests and commands from the workflow administrator agent by an Application Programming Interface (API); and forwarding the received requests and commands to the workflow administrator.

13. The method of claim 12, comprising:

receiving responses to requests and commands from the workflow administrator by the API; and forwarding the received responses to requests and commands to the workflow administrator agent.

14. The method of claim 13, comprising querying the workflow database by the workflow administrator to retrieve information responsive to a request from the workflow administrator agent.

15. The method of claim 14, wherein querying the workflow database comprises querying as to available workflows that require execution.

16. The method of claim 11, comprising maintaining business logic as to steps that form a part of a given workflow at the workflow registry.

17. The method of claim 11, comprising operating the workflow engine remote from the computer-based customer infrastructure.

18. The method according to claim 11, wherein the workflow administrator does not have direct access to code of the given workflow executed in the computer-based customer infrastructure.

19. The method according to claim 11, further comprising providing information within the metadata that is a code-less version of the workflow.

20. The method according to claim 19, wherein the metadata comprises at least one of the group comprising:
- at least one task contained in the given workflow;
- a dependency structure between the at least one task and another task of the given workflow;
- a schedule of execution of the given workflow; and
- information regarding a runtime environment of the given workflow.

* * * * *

UNITED STATES PATENT AND TRADEMARK OFFICE
CERTIFICATE OF CORRECTION

| | |
|---|---|
| PATENT NO. | : 11,481,263 B2 |
| APPLICATION NO. | : 16/945161 |
| DATED | : October 25, 2022 |
| INVENTOR(S) | : Jeremiah Leeam Lowin et al. |

It is certified that error appears in the above-identified patent and that said Letters Patent is hereby corrected as shown below:

In the Specification

Column 13, Line 48, replace "hack" with --back--.

Column 14, Line 27, replace "metadatato" with --metadata to--.

Column 17, Line 22, replace "structure" with --infrastructure--.

Signed and Sealed this
Thirty-first Day of January, 2023

Katherine Kelly Vidal
*Director of the United States Patent and Trademark Office*